United States Patent
Urano et al.

(10) Patent No.: US 7,071,265 B2
(45) Date of Patent: *Jul. 4, 2006

(54) METHOD OF PRODUCING A NON-CROSSLINKED POLYMER PARTICLE

(75) Inventors: Chisato Urano, Minamiashigara (JP); Yoshihiro Inaba, Minamiashigara (JP); Masato Mikami, Minamiashigara (JP); Takako Kobayashi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/389,916

(22) Filed: Mar. 18, 2003

(65) Prior Publication Data

US 2004/0034171 A1    Feb. 19, 2004

(30) Foreign Application Priority Data

Aug. 15, 2002  (JP) .............................. 2002-236876

(51) Int. Cl.
C08F 8/32 (2006.01)
C08F 220/34 (2006.01)

(52) U.S. Cl. .................... 525/375; 525/330.3; 525/85; 526/258; 526/260; 526/319; 526/219.6

(58) Field of Classification Search ................ 525/375, 525/330.3, 85; 526/258, 260, 319, 219.6, 526/219; 524/548

See application file for complete search history.

(56) References Cited

U.S. PATENT DOCUMENTS

| | | |
|---|---|---|
| 4,070,348 A | 1/1978 | Kraemer et al. |
| 4,837,107 A | 6/1989 | Axelsson et al. |
| 5,280,095 A | 1/1994 | Aizawa et al. |
| 5,308,749 A | 5/1994 | Sutton et al. |
| 6,203,956 B1 | 3/2001 | Urano et al. |
| 6,413,691 B1 | 7/2002 | Daimon et al. |
| 6,489,838 B1 | 12/2002 | Tsinker |
| 6,492,876 B1 | 12/2002 | Kamal et al. |
| 2004/0039109 A1 | 2/2004 | Urano et al. |

FOREIGN PATENT DOCUMENTS

| | | |
|---|---|---|
| JP | A 58-219455 | 12/1983 |
| JP | A 63-90521 | 4/1988 |
| JP | A 63-191805 | 8/1988 |
| JP | A 63-191818 | 8/1988 |
| JP | A 64-33111 | 2/1989 |
| JP | A 2-166102 | 6/1990 |
| JP | A 5-216049 | 8/1993 |
| JP | A 10-310603 | 11/1998 |
| JP | B2 3238736 | 10/2001 |

OTHER PUBLICATIONS

U.S. Appl. No. 10/390,004, filed Mar. 2003, Urano et al.*
U.S. Application No. 10/390,004 filed Mar. 18, 2003.

* cited by examiner

Primary Examiner—James J. Seidleck
Assistant Examiner—Olga Asinovsky
(74) Attorney, Agent, or Firm—Oliff & Berridge, PLC

(57) ABSTRACT

A method of producing a non-crosslinked polymer particle having in a side chain thereof a succinimidoxycarbonyl group represented by the following structural formula (1):

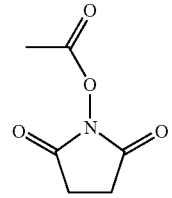

Structual formula (1)

the method comprising the step of using an initiator to polymerize a polymerizable monomer (A) containing a succinimidoxycarbonyl group represented by the above structural formula (1) and a polymerizable monomer (B) containing one polymerizable moiety in the monomer in a non-aqueous solvent in the presence of a macromolecular dispersion stabilizer.

In this process the non-aqueous solvent is a solvent in which the polymerizable monomer (A) and the polymerizable monomer (B) are soluble and the non-crosslinked polymer particle is insoluble.

18 Claims, 2 Drawing Sheets

F I G. 1
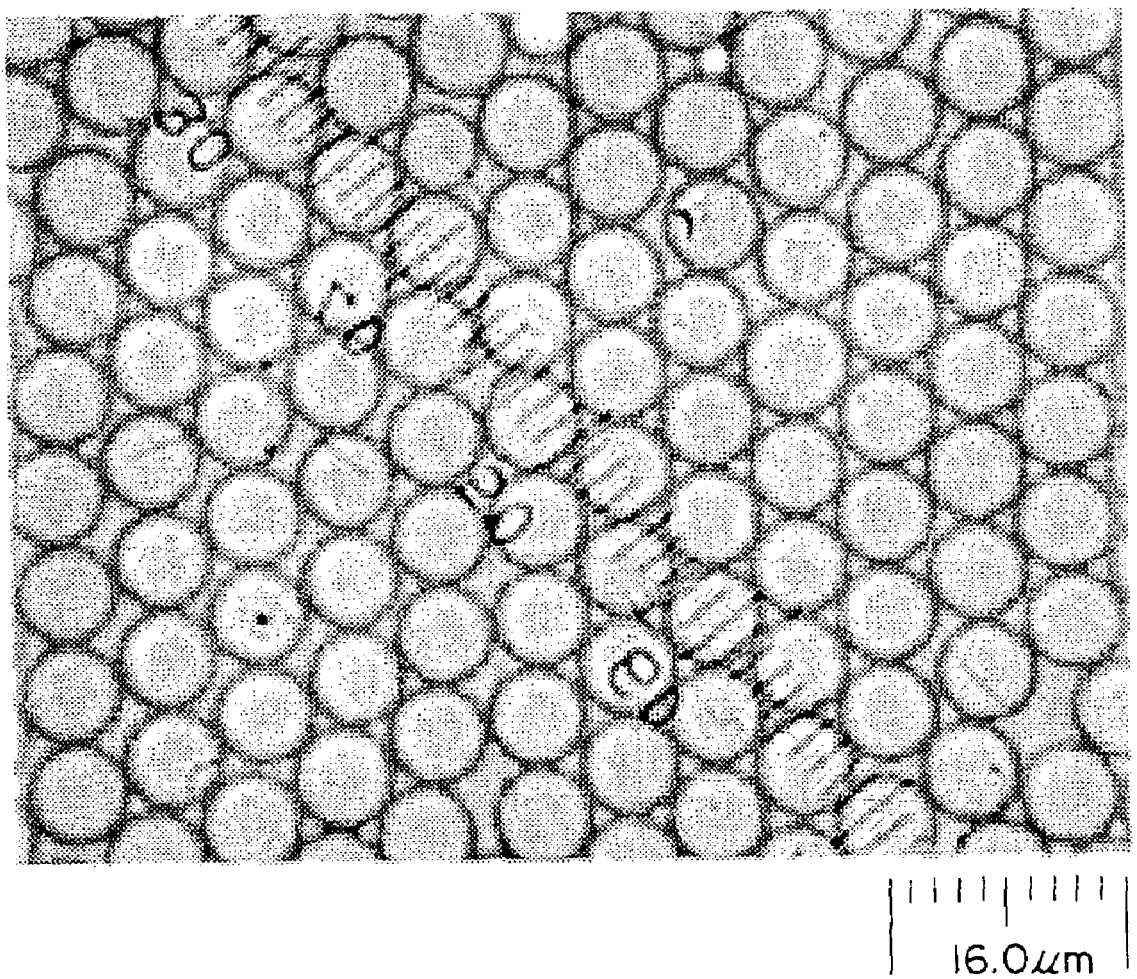

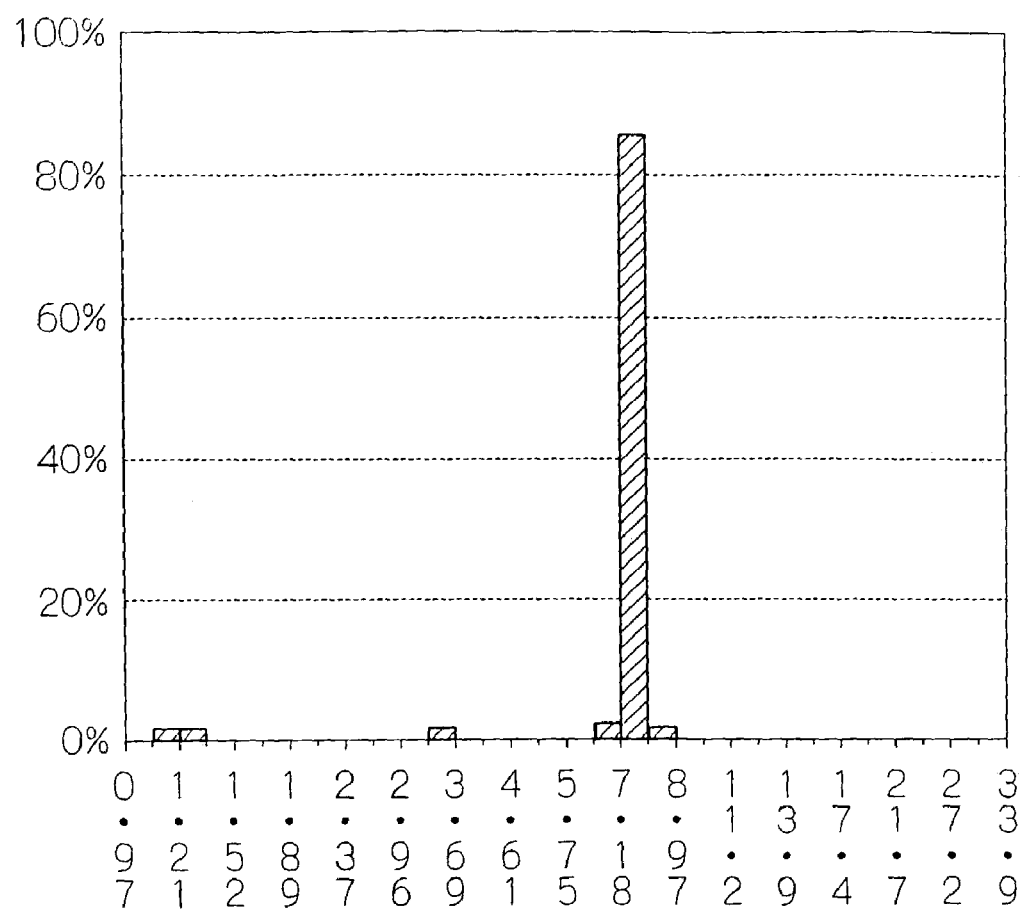

METHOD OF PRODUCING A NON-CROSSLINKED POLYMER PARTICLE

BACKGROUND OF THE INVENTION

1. Field of the Invention

The present invention relates to a method of producing a polymer particle.

2. Description of the Related Art

Hitherto, polymer particles having a particle diameter of about 0.01 to 50 μm have been useful for spacers, standard particles, diagnostic drug particles for examining antigen-antibody reaction, particles for catalysts, particles for combinatorial chemistry, additives for toner, cosmetic additives, rheology control agents, low profile additives, improvers of mechanical properties of resin, antiblocking agents for resin films, lubricants for films, traveling performance stabilizers for thermosensitive paper, and so on, and have been used in various fields.

Furthermore, when polymer particles having a highly reactive functional group such as a succinimidoxycarbonyl group are used for the above-mentioned purposes, the particles are even more useful materials.

In general, polymer particles having a particle diameter within the above-mentioned range are produced by granulation in an aqueous solvent by a method such as ordinary emulsion polymerization or suspension polymerization. However, it is difficult to produce polymer particles having a functional group which has high reactivity and is decomposed in water, such as a succinimidoxycarbonyl group, by ordinary emulsion polymerization or suspension polymerization in water using a polymerizable monomer having a succinimidoxycarbonyl group.

Japanese Patent No. 3238736 suggests, as a process for producing polymer particles having a succinimidoxycarbonyl group, a process of producing particles by emulsion polymerization in water using a polymerizable monomer having high hydrophobicity as a copolymerizable component. According to this process, the copolymerizable component having high hydrophobicity causes the succinimidoxycarbonyl group to be introduced into the particles, whereby hydrolysis of the succinimidoxycarbonyl group by water may be prevented to some degree. However, the decomposition thereof cannot be completely prevented.

U.S. Pat. No. 4,070,348 discloses a process of subjecting a mixture of a monomer component and a non-aqueous solvent to suspension polymerization in a non-polar solvent, thereby producing particles while retaining succinimidoxycarbonyl groups therein. However, when granulation is carried out by suspension polymerization, it is difficult to obtain particles having a target particle diameter with satisfactory particle size distribution. Therefore, in order to obtain particles having a narrow particle size distribution, it is necessary to perform a classification operation. Thus, a yield of the particles is reduced. It is also necessary to remove the non-aqueous solvent, which is mixed with the monomer component.

A different example of a process for producing polymer particles is a process of using a polymerizable monomer having a moiety capable of introducing a succinimidoxycarbonyl group to produce polymer particles by emulsion polymerization or suspension polymerization and subsequently introducing a succinimidoxycarbonyl group into the moiety. Although this process makes it possible to produce the particles at a high yield so as to have the same component ratio as the starting composition has, the step of introducing a succinimidoxycarbonyl group afterwards is required. Further, if the polymerizable monomer having the moiety capable of introducing a succinimidoxycarbonyl group is not commercially available, the monomer must be inevitably synthesized. Thus, many steps are required and the present process cannot be easily carried out.

As described above, it has been hitherto difficult to produce non-crosslinked polymer particles having a highly reactive functional group, such as a succinimidoxycarbonyl group, by a simple method with a narrow particle size distribution and a high yield.

SUMMARY OF THE INVENTION

An object of the present invention is to provide a method of producing a non-crosslinked polymer particle having a highly reactive succinimidoxycarbonyl group in a simple manner, so as to obtain a narrow particle size distribution and a high yield.

The above-mentioned object is attained by the following:

A first aspect of the invention provides a method of producing a non-crosslinked polymer particle having in a side chain thereof a succinimidoxycarbonyl group represented by the following structural formula (1):

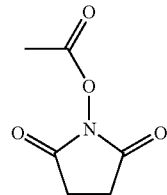

Structual formula (1)

the method comprising the step of using an initiator to polymerize 0.1 to 100% by mole of a polymerizable monomer (A) containing a succinimidoxycarbonyl group represented by the above structural formula (1) and 99.9 to 0% by mole of a polymerizable monomer (B) containing one polymerizable moiety in the monomer in a non-aqueous solvent in the presence of a macromolecular dispersion stabilizer, wherein the non-aqueous solvent is a solvent in which the polymerizable monomer (A) and the polymerizable monomer (B) are soluble and the non-crosslinked polymer particle is insoluble.

A second aspect of the invention provides a method of producing a non-crosslinked polymer particle according to the first aspect, wherein the polymerizable monomer (A) may be at least one selected from the group consisting of N-acryloxysuccinimide and N-methacryloxysuccinimide.

A third aspect of the invention provides a method of producing a non-crosslinked polymer particle according to the first aspect, wherein the non-aqueous solvent is preferably methanol.

A fourth aspect of the invention provides a method of producing a non-crosslinked polymer particle according to the first aspect, wherein a number average particle diameter of the non-crosslinked polymer particles is preferably from 0.01 to 50 μm, and a coefficient of variation of the number average particle diameter is preferably from 0.01 to 30%.

A fifth aspect of the invention provides a method of producing a non-crosslinked polymer particle according to the first aspect, wherein a number average particle diameter of the non-crosslinked polymer particles is more preferably from 0.01 to 20 μm, and a coefficient of variation of the number average particle diameter is more preferably from 0.01 to 30%.

BRIEF DESCRIPTION OF THE DRAWINGS

FIG. 1 is a microphotograph of the polymer particles obtained in Example 1.

FIG. 2 is a graph showing particle size distribution of the polymer particles obtained in Example 1.

DETAILED DESCRIPTION OF THE INVENTION

The present invention will be described in detail hereinafter.

The polymerizable monomer (A) is not particularly limited and may be any monomer having in the molecule thereof a succinimidoxycarbonyl group represented by the following structural formula (1):

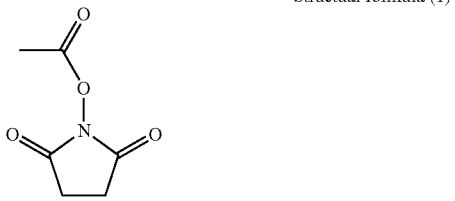

Structual formula (1)

and a single unsaturated group capable of being radical-polymerized. Particularly preferred is N-acryloxysuccinimide or N-methacryloxysuccinimide since the monomers itself can easily be produced.

A single kind of the polymerizable monomer (A) may be used alone, or a combination of two or more of the polymerizable monomers (A) may be used.

As the polymerizable monomer (B), a polymerizable monomer containing one polymerizable moiety in the monomer can be used. This polymerizable monomer (B) is not particularly limited about the kind thereof and may be any polymerizable monomer having in the molecule thereof an unsaturated group (polymerizable moiety) capable of being radical-polymerized. Specific example thereof include styrene-based monomers such as styrene, methylstyrene, ethylstyrene, chlorostyrene, styrenesulfonic acid, and t-butoxystyrene; (meth)acrylic ester-based monomers such as methyl (meth)acrylate, ethyl (meth)acrylate, n-propyl (meth)acrylate, i-propyl (meth)acrylate, n-butyl (meth)acrylate, 2-ethylhexyl (meth)acrylate, lauryl (meth)acrylate, glycidyl (meth)acrylate, dimethylaminoethyl (meth)acrylate, hydroxyethyl (meth)acrylate, diethylene glycol mono(meth) acrylate, polyethylene glycol mono(meth)acrylate, and butanediol mono(meth)acrylate; unsaturated carboxylic acid-based monomers such as (meth)acrylic acid and maleic acid; alkyl vinyl ether-based monomers such as methyl vinyl ether and ethyl vinyl ether; vinyl ester-based monomers such as vinyl acetate and vinyl butyrate; (meth)acrylamide-based monomers such as (meth)acrylamide, N-methyl(meth)acrylamide and N-ethyl(meth)acrylamide; and nitrile-based monomers such as (meth)acrylonitrile. [The wording "(meth)acryl" means "acryl" and "methacryl", and the wording "(meth)acrylic" means "acrylic" and "methacrylic".]

Among these polymerizable monomers (B), methyl methacrylate is preferred. The polymerizable monomers (B) may be used alone or in combination of two or more thereof.

Regarding a composition ratio between the polymerizable monomer (A) and the polymerizable monomer (B), the polymerizable monomer (A) is 0.1 to 100% by mole and the polymerizable monomer (B) is 99.9 to 0% by mole. It is preferable that the polymerizable monomer (A) be 0.1 to 50% by mole and the polymerizable monomer (B) be 99.9 to 50% by mole, and it is more preferable that the polymerizable monomer (A) be 0.1 to 20% by mole and the polymerizable monomer (B) be 99.9 to 80% by mole.

In the case that two or more kinds of the polymerizable monomers (A) or the polymerizable monomers (B) are used together, the composition ratio between the polymerizable monomers(A) and the polymerizable monomers (B) means the ratio between the total mole number of the polymerizable monomers (A) and the total mole number of the polymerizable monomers (B).

The macromolecular dispersion stabilizer used in the invention, which may be referred to merely as the dispersion stabilizer hereinafter, may be any macromolecular dispersion stabilizer, and is preferably a dispersion stabilizer made of a macromolecule having a weight average molecular weight of 10,000 to 2,000,000. Specific examples thereof include polyvinyl alcohol, partially saponified polyvinyl acetate, polyvinyl pyrrolidone, polyvinyl acetamide, poly (meth)acrylic acid, poly(meth)acrylate, copolymers of poly (meth)acrylic acid and poly(meth)acrylic ester, copolymers of poly(meth)acrylic acid and vinyl ether, polyvinyl alkyl ether, copolymers of poly(meth)acrylic acid and styrene, polystyrenesulfonic acid, and celluloses such as methylcellulose, ethylcellulose, hydroxyethylcellulose, hydroxypropylcellulose, and carboxymethylcellulose.

Among these examples, polyvinyl pyrrolidone, hydroxypropylcellulose, polyvinyl acetamide, polyvinyl alkyl ether, polyvinyl alcohol, and partially saponified polyvinyl acetate are preferred. The macromolecular dispersion stabilizer may be used alone or in combination of two or more thereof.

The amount of the dispersion stabilizer to be added is preferably from 0.1 to 25% by mass, more preferably from 0.5 to 15% by mass of the total amount of the non-aqueous solvent.

In the case that the non-crosslinked polymer particles are produced, various surface active agents may be further added. Specific examples thereof include anionic surface active agents such as sodium dodecylbenzenesulfonate, sodium laurylsulfate, and sodium alkyldiphenyldisulfonate; and nonionic surface active agents such as polyoxyethylene nonyl phenyl ether.

The amount of the surface active agent to be added is preferably from 0 to 25% by mass, more preferably from 0 to 15% by mass of the total amount of the non-aqueous solvent.

In the case that the non-crosslinked polymer particles are produced, a redox type compound may be further added. The redox type compound to be used is not particularly limited about the kind thereof and may be any compound having redox capability. Specific examples thereof include ascorbic acid, isoascorbic acid, tocopherol, hydroquinone, catechol, and resorcin. The amount of the redox type compound to be used is usually from 0 to 10.0 parts by mass, preferably from 0 to 5.0 parts by mass per 100 parts by mass of all the polymerizable monomers.

The initiator used in the invention is not particularly limited to the kind thereof, and may be any radical polymerization initiator which is soluble in the non-aqueous solvent, which will be described in detail later. Typical examples thereof include peroxides such as t-butylperoxide, t-amylperoxide, cumylperoxide, acetylperoxide, propionylperoxide, benzoylperoxide, lauroylperoxide, t-butylhydroperoxide, cyclohexylhydroperoxide, t-butylperacetate, and t-butylperbenzoate; azo compounds such as 2,2'-azobisisobutyronitrile (AIBN), dimethyl 2,2-azobisisobutyrate, 2,2'-azobis(2,4-dimethylvaleronitrile), and 2,2'-azobis[2-methyl-N-(2-hydroxyethyl)-propionamide].

These initiators are used usually in an amount of 0.01 to 50 parts by mass, preferably from 0.1 to 10 parts by mass per 100 parts by mass of all the polymerizable monomers.

The non-aqueous solvent used in the invention is generally a solvent in which the polymerizable monomers as the starting materials are soluble and the non-crosslinked polymer particle as the resultant product is insoluble. Examples of the non-aqueous solvent include alcohols having 1 to 6 carbon atoms, ketones, esters and cellosolves.

Examples of the alcohols having 1 to 6 carbon atoms include methanol, ethanol, iso-propylalcohol, n-propylalcohol, iso-butylalcohol, sec-butylalcohol, tert-butylalcohol, iso-amylalcohol, sec-amylalcohol, and tert-amylalcohol.

Examples of the ketones include acetone and methyl ethyl ketone. Examples of the esters include ethyl acetate and butyl acetate. Examples of the cellosolves include methylcellosolve, ethylcellosolve, propylcellosolve and butylcellosolve.

Among these examples, methanol, ethanol, iso-propylalcohol, and n-propylalcohol are preferred. Methanol is particularly preferred.

In the polymerization reaction in the invention, the non-aqueous solvents may be used alone or in combination of two or more thereof. In the case that the non-aqueous solvents are used in combination, a preferred example of the combination is an alcohol and a cellosolve.

The non-crosslinked polymer particles are produced by using the initiator to polymerize the polymerizable monomers in the non-aqueous solvent in the presence of the macromolecular dispersion stabilizer. Initially, the polymerization proceeds in the solution in which the polymerizable monomers are dissolved in the solvent. However, as the polymerization proceeds further, the generated non-crosslinked polymer particles precipitate from the solvent.

The temperature at the time of the polymerization is generally from 20 to 120° C., preferably from 50 to 100° C. When a large amount of oxygen is present in the system of the polymerization reaction, the polymerization reaction is affected by the oxygen so that polymer particles in the form of a uniform fine sphere cannot be yielded with a high reproducibility. Accordingly, the gas inside the polymerization system is substituted as much as possible with an inert gas such as nitrogen. It is also preferred to handle the polymerization starting materials in an inert gas atmosphere.

Under the above-mentioned polymerization conditions, spherical copolymer particles containing a succinimidoxycarbonyl group and having a completely spherical particle shape and a very narrow particle size distribution can be obtained in a high yield. About particle properties of the resultant non-crosslinked polymer particles, the number average particle diameter thereof is usually from 0.01 to 50 µm, preferably from 0.01 to 20 µm. The coefficient of variation of the average particle diameter, which is an index of particle size distribution, is from 0.01 to 30%, preferably from 0.1 to 10%, and still more preferably from 0.5 to 5%.

The coefficient of variation of the number average particle diameter, which is an index of particle size distribution, is defined as follows. A standard deviation of the distribution is obtained on the basis of particle diameter data on the particle diameters and the number average particle diameter, which are obtained by a Coulter counter; the standard deviation is divided by the number average particle diameter and then the resultant value is multiplied by 100 since the standard deviation has a unit of length (µm) and the value of the standard deviation is affected by the magnitude of the number average particle diameter; and the thus-obtained dimensionless value is defined as the coefficient of variation (%) of the number average particle diameter.

The polymer particles obtained by the invention can be used suitably for various products, for example, spacers for a liquid crystal display panel, standard particles, diagnostic drug particles for examining antigen-antibody reaction, particles for catalysts, particles for combinatorial chemistry, toners for electrophotography, additives for chromatography, cosmetic additives, and coating agents.

EXAMPLES

The following will describe working examples of the present invention, but these are mere examples for explanation and the invention is not limited by these examples.

Respective measured values in the examples were obtained as follows.

(1) Measurement of particle diameter and number average particle diameter: They were measured with a Coulter counter.

(2) Calculation of standard deviation and coefficient of variation:

On the basis of the particle diameter data obtained above, the standard deviation (µm), which is an index of the particle size distribution, was obtained. By dividing the standard deviation by the number average particle diameter and then multiplying the resultant value by 100, the dimensionless coefficient of variation (%) was calculated.

(3) Analysis of polymer particle composition: The composition of polymer particles was analyzed by $^1$H NMR (300 MHz), made by Varian. As the solvent for the measurement, $CDCl_3$ was used.

EXAMPLE 1

As a reaction vessel, a 300-mL separable four-neck flask made of Pyrex glass (registered trade mark) was used, and a cooling pipe having a nitrogen gas release pipe in its upper portion, and a nitrogen gas introducing pipe were provided with the reaction vessel. A stirrer made of iron coated with Teflon (registered trade mark) and an electromagnetic external stirring device were used to perform stirring. The reaction vessel was set inside an oil bath.

To the reaction vessel purged with nitrogen was added 75 g of a methanol solution in which 2.2% by mass of polyvinyl pyrrolidone (PVP) having a molecular weight (Mw) of 360,000, which is a macromolecular dispersion stabilizer, was dissolved. Next, to the reaction vessel were successively added 21 g (90% by mole) of methyl methacrylate (MMA) purified by vacuum distillation, 4.0 g (10% by mole) of N-acryloxysuccinimide (AS), and 0.25 g of azobisisobutyronitrile (AIBN) as an initiator. Nitrogen gas was blown through the nitrogen gas introducing pipe into the liquid phase for 2 hours while the phase was stirred. In this way, dissolved oxygen was removed. Next, the nitrogen gas introducing pipe into the liquid phase was substituted with a nitrogen gas introducing pipe into the gas phase. While nitrogen gas was blown into the gas phase, the reaction was continued at a reaction temperature of 55° C. for 16 hours.

As a result, polymer particles having a number average particle diameter of 6.1 μm were obtained (yield: 91% by mass). The standard deviation, which is index of the particle size distribution thereof, and the coefficient of variation of the polymer particles were 1.3 μm and 23%, respectively. A photograph of the resultant polymer particles, taken with an optical microscope, is shown in FIG. 1, and the particle size distribution thereof is shown in FIG. 2. In FIG. 2, the x-axis represents particle diameter (μm), and the y-axis represents frequency (%). The result of the composition analysis of the polymer particles by $^1$H NMR demonstrated that the composition ratio between MMA and AS was 90:10, which was equal to the molar ratio when the raw material was charged.

EXAMPLE 2

Polymer particles were produced in the same way as in Example 1 except that 2.3 g (10% by mole) of N-methacryloxysuccinimide (MS) was used instead of N-acryloxysuccinimide, the amount of azobisisobutyronitrile (AIBN) was changed to 1.3 g, and the reaction temperature was changed to 60° C.

As a result, polymer particles having a number average particle diameter of 7.8 μm were obtained (yield: 91% by mass). The standard deviation, which is index of the particle size distribution thereof, and the coefficient of variation of the polymer particles were 1.6 μm and 22%, respectively. The result of the composition analysis of the polymer particles by $^1$H NMR demonstrated that the composition ratio between MMA and MS was 90:10, which was equal to the molar ratio when the raw material was charged.

Comparative Example 1

To a 500-mL stainless steel cup were put 100 g of a solution of 1% by mass of polyvinyl alcohol, 21 g (90% by mole) of methyl methacrylate (MMA), 4.0 g (10% by mole) of N-acryloxysuccinimide (AS), and 0.25 g of azobisisobutyronitrile (AIBN) as an initiator, and then a homogenizer was used to emulsify the mixture at 10000 rpm for 3 minutes. In this way, an emulsion was obtained. Next, the emulsion was transferred into a 300-mL separable four-neck flask made of Pyrex glass (registered trade mark). Nitrogen gas was blown through the nitrogen gas introducing pipe into the liquid phase for 2 hours while the phase was stirred. In this way, dissolved oxygen was removed. Next, the nitrogen gas introducing pipe into the liquid phase was substituted with a nitrogen gas introducing pipe into the gas phase. While nitrogen gas was blown into the gas phase, the reaction was continued at a reaction temperature of 60° C. for 16 hours.

As a result, polydispersible polymer particles having a number average particle diameter of 2.2 μm were obtained (yield: 75% by mass). The standard deviation, which is index of the particle size distribution thereof, and the coefficient of variation of the polymer particles were 8.6 μm and 115%, respectively. The result of the composition analysis of the polymer particles by $^1$H NMR demonstrated that the polymer particles contained no AS and were particles consisting of only polymerized MMA.

It is understood from these examples that non-crosslinked spherical copolymer particles having a succinimidoxycarbonyl group and a narrow particle size distribution can be obtained in a high yield through only a single polymerization step.

As described above, according to the invention, there can be provided a method of producing a non-crosslinked polymer particle having a succinimidoxycarbonyl group, which has high reactivity, easily so as to give a high yield and a narrow particle size distribution.

What is claimed is:

1. A method of producing a non-crosslinked polymer particle having in a side chain thereof a succinimidoxycarbonyl group represented by the following structural formula (1):

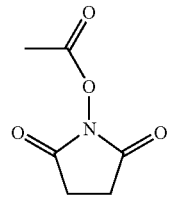

Structual formula (1)

the method comprising the step of using an initiator to polymerize 0.1 to 100% by mole of a polymerizable monomer (A) containing a succinimidoxycarbonyl group represented by the above structural formula (1) and 99.9 to 0% by mole of a polymerizable monomer (B) containing one polymerizable moiety in the monomer in a non-aqueous solvent in the presence of a macromolecular dispersion stabilizer, wherein the non-aqueous solvent is a solvent in which the polymerizable monomer (A) and the polymerizable monomer (B) are soluble and the non-crosslinked polymer particle is insoluble.

2. A method of producing a non-crosslinked polymer particle according to claim 1, wherein the polymerizable monomer (A) is at least one selected from the group consisting of N-acryloxysuccinimide and N-methacryloxysuccinimide.

3. A method of producing a non-crosslinked polymer particle according to claim 1, wherein the non-aqueous solvent is methanol.

4. A method of producing a non-crosslinked polymer particle according to claim 1, wherein the polymerizable monomer (B) is methyl methacrylate.

5. A method of producing a non-crosslinked polymer particle according to claim 1, wherein a weight average molecular weight of the macromolecular dispersion stabilizer is from 10,000 to 2,000,000.

6. A method of producing a non-crosslinked polymer particle according to claim 1, wherein the macromolecular dispersion stabilizer is at least one selected from the group consisting of polyvinyl pyrrolidone, hydroxypropyl cellulose, polyvinyl acetamide, polyvinyl alkyl ether, polyvinyl alcohol, and partially saponified polyvinyl acetate.

7. A method of producing a non-crosslinked polymer particle according to claim 1, wherein a surface active agent is further added to the non-aqueous solvent.

8. A method of producing a non-crosslinked polymer particle according to claim 1, wherein a redox type compound is further added to the non-aqueous solvent.

9. A method of producing a non-crosslinked polymer particle according to claim 1, wherein an amount of the polymerizable monomer (A) is from 0.1 to 50% by mole, and an amount of the polymerizable monomer (B) is from 99.9 to 50% by mole.

10. A method of producing a non-crosslinked polymer particle according to claim 1, wherein an amount of the polymerizable monomer (A) is from 0.1 to 20% by mole, and an amount of the polymerizable monomer (B) is from 99.9 to 80% by mole.

11. A method of producing a non-crosslinked polymer particle according to claim 1, wherein the polymerization is carried out in an inert gas atmosphere.

12. A method of producing a non-crosslinked polymer particle according to claim 1, wherein the polymerization is carried out at 50 to 100° C.

13. A method of producing a non-crosslinked polymer particle according to claim 1, wherein the polymerizable monomer (A) is 10% by mole of N-acryloxysuccinimide, the polymerizable monomer (B) is 90% by mole of methyl methacrylate, the non-aqueous solvent is methanol, the macromolecular dispersion stabilizer is polyvinyl pyrrolidone, and the initiator is azobisisobutyronitrile.

14. A method of producing a non-crosslinked polymer particle according to claim 1, wherein the polymerizable monomer (A) is 10% by mole of N-methacryloxysuccinimide, the polymerizable monomer (B) is 90% by mole of methyl methacrylate, the non-aqueous solvent is methanol, the macromolecular dispersion stabilizer is polyvinyl pyrrolidone, and the initiator is azobisisobutyronitrile.

15. A method of producing a non-crosslinked polymer particle according to claim 1, wherein a number average particle diameter of the non-crosslinked polymer particles is from 0.01 to 50 μm, and a coefficient of variation of the number average particle diameter is from 0.01 to 30%.

16. A method of producing a non-crosslinked polymer particle according to claim 1, wherein a number average particle diameter of the non-crosslinked polymer particles is from 0.01 to 20 μm, and a coefficient of variation of the number average particle diameter is from 0.01 to 30%.

17. A method of producing a non-crosslinked polymer particle according to claim 1, wherein a number average particle diameter of the non-crosslinked polymer particles is from 0.01 to 20 μm, and a coefficient of variation of the number average particle diameter is from 0.1 to 10%.

18. A method of producing a non-crosslinked polymer particle according to claim 1, wherein a number average particle diameter of the non-crosslinked polymer particles is from 0.01 to 20 μm, and a coefficient of variation of the number average particle diameter is from 0.5 to 5%.

* * * * *